(12) United States Patent
Sumiyashiki

(10) Patent No.: US 6,318,664 B1
(45) Date of Patent: Nov. 20, 2001

(54) WEBBING RETRACTOR

(75) Inventor: Akira Sumiyashiki, Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 09/526,687

(22) Filed: Mar. 15, 2000

(30) Foreign Application Priority Data

Apr. 16, 1999 (JP) .................................................. 11-109583

(51) Int. Cl.⁷ .................................................. B65H 75/48
(52) U.S. Cl. ........................ 242/379; 242/379.2; 280/806
(58) Field of Search .............................. 242/379, 379.2, 242/379.1; 280/806; 297/478

(56) References Cited

U.S. PATENT DOCUMENTS

| 4,204,652 | * | 5/1980 | Cislak et al. ........................ 242/107.4 |
| 4,285,478 | * | 8/1981 | Stamboulian ........................ 242/107 |
| 4,603,819 | * | 8/1986 | Loose et al. ........................ 242/107.4 |
| 4,607,805 | * | 8/1986 | Burghardt et al. ................. 242/107.4 |
| 4,667,893 | * | 5/1987 | Fohl .................................. 242/107.2 |
| 5,484,118 | * | 1/1996 | Fujimura et al. .................. 272/384.2 |
| 5,826,813 | * | 10/1998 | Hibata ............................... 242/383.1 |

* cited by examiner

Primary Examiner—Donald P. Walsh
Assistant Examiner—David A Jones
(74) Attorney, Agent, or Firm—Nixon Peabody LLP; Thomas W. Cole

(57) ABSTRACT

A sensor holder and a sensor cover are provided at an outer side of a first leg plate of a webbing retractor. Attachment holes formed in the first leg plate and engaging pawls which engage with sensor openings are formed at appropriate portions of a sensor holder. Removal preventing portions are formed at corresponding portions of the sensor cover so as to prevent the engaging pawl from coming out of the attachment hole. Thus, the sensor holder and the sensor cover can be firmly secured to the first leg plate of the frame without using plugs.

6 Claims, 15 Drawing Sheets

WEBBING RETRACTOR

BACKGROUND OF THE INVENTION

1. Field of the Invention

The present invention relates to a webbing retractor which takes up a webbing for restraining a vehicle occupant by winding the webbing in layers onto a winding shaft.

2. Description of the Related Art

A webbing retractor, which winds up in layers a webbing for restraining a vehicle occupant, is attached to a vehicle body through a frame which, when viewed from top, is formed in a substantial U-shape. A winding shaft (spool) for taking up the webbing in layers is rotatably supported between a pair of leg plates of the frame. A spring cover made of resin is attached to the outer side of one of the leg plates. An urging means (a power spring), which applies an urging force to the winding shaft such that the shaft is rotated in the direction in which the webbing is taken up, is provided between the leg plate and the spring cover. Further, a sensor cover made of resin is attached to the outer side of the other leg plate. A locking mechanism (including a sensor) for instantaneously preventing the winding shaft from rotating in the direction in which the webbing is drawn out when the vehicle decelerates suddenly, is provided between the leg plate and the sensor cover.

In conventional webbing retractors, plugs are used as a means for fixing a sensor cover or the like to a leg plate of a frame. However, in the process of improving webbing retractors, the functions and forms of the sensor cover and the like have been changing, and fixing a cover by plugs may not always be adequate.

SUMMARY OF THE INVENTION

In view of the aforementioned, an object of the present invention is to provide a webbing retractor in which a cover can be fixed to a leg plate of a frame without using plugs.

A webbing retractor relating to a first aspect of the present invention includes: a frame which is fixed to a vehicle body, and has a pair of leg plates which rotatably support therebetween a winding shaft for winding in layers a webbing for restraining a vehicle occupant, and which has one or more attachment holes in each of the leg plates; a first cover which is disposed at an outer side of the leg plate of the frame and is provided with one or more engaging pawls to be engaged with a peripheral portion of the attachment hole by deforming elastically within a range of an opening width of the attachment hole; and a second cover adapted to be secured to the leg plate so as to cover the first cover, and having one or more removal preventing portions to be inserted in the corresponding attachment holes to prevent the engaging pawl from coming out of the attachment hole.

A webbing retractor relating to a second aspect of the present invention is characterized in that, in the invention of the first aspect, the first cover includes a shaft-supporting portion which rotatably supports the winding shaft, and a sensor holding portion which holds a sensor section which detects a state of sudden deceleration of the vehicle; and the second cover includes a sensor protection portion which protects said sensor section.

According to the first aspect of the present invention, the one or more attachment holes are formed in the leg plate of the frame, and correspondingly, the one or more engaging pawls are provided at the first cover. First, while the first cover is being disposed at the outer side of the leg plate, the one or more engaging pawls of the first cover are inserted into the one or more attachment holes of the leg plate of the frame. The engaging pawl inserted into the attachment hole engages with the peripheral portion of the attachment hole by elastically deforming within the range of the opening width of the attachment hole.

Next, the second cover is fitted to the first cover so as to cover the first cover. The one or more removal preventing portions are provided at the second cover at such positions at which they can be inserted into the attachment holes. The removal preventing portion is inserted in the attachment hole such that the engaging pawl may not come out of the attachment hole. Then, the second cover is fixed to the leg plate of the frame. In the state in which the second cover is fixed to the leg plate, the engaging pawl cannot deform elastically toward the side in the direction in which the engaging pawl comes out since the removal preventing portion is placed at the side of the engaging pawl in the direction in which the engaging pawl comes out, as described above. Thus, removal of the first cover from the leg plate of the frame is prevented.

Thus, according to the present invention, at least the first cover can be fixed to the leg plate of the frame without using plugs.

According to the second aspect of the present invention, the first cover includes a shaft supporting portion which rotatably supports a winding shaft, and a sensor holding portion which holds a sensor section which detects a sudden deceleration state of a vehicle, and the second cover comprises a sensor protection portion which protects the sensor section. That is, in the present invention, two types of covers which have different functions from each other are provided at the sensor.

In such a case, if the first cover and the second cover were respectively fixed to the leg plate by plugs, many plugs would need to be hammered into the leg plate. This would cause various disadvantages such as, it would be difficult to secure the space for these plugs to be hammered, or the task of fitting the covers would be troublesome or time-consuming, or the like. However, all these problems are eliminated by applying the first aspect of the present invention.

Further, although the first cover is provided with the shaft-supporting portion which rotatably supports the winding shaft, if the first cover were fixed to the leg plate by using plugs, the attachment strength of the first cover to the leg plate in the direction of thrust (axial direction) would likely be low. Therefore, some device would be needed for preventing removal of the first cover from the leg plate when a load in a direction of thrust were applied from the winding shaft to the shaft-supporting portion of the first cover for a long time period. However, by applying the first aspect of the present invention, as long as the state of the second cover being attached to the leg plate is maintained, the first cover will not come off from the leg plate since the elastic deformation of the engaging pawl of the first cover in a direction of the engaging pawl coming put of the attachment hole is impeded by the removal preventing portion of the second cover.

In addition, if the first cover were fixed to the leg plate by using plugs, the positioning of the first cover with respect to the leg plate would be difficult. That is, accuracy in positioning the first cover with respect to the leg plate would likely be low. However, if the first aspect of the present invention is applied, by inserting the removal preventing portion into the attachment hole, the engaging pawl of the first cover is restrained by being engaged with the peripheral portion of the mounting hole. Thus, the position of the first cover with respect to the leg plate does not deviate. Namely, the precision of positioning the first cover with respect to the leg plate improves.

From the above, it can be seen that the present invention is a suitable attachment structure for attaching the first cover which functions as a shaft-supporting portion.

DESCRIPTION OF THE PREFERRED EMBODIMENTS

A webbing retractor 10 relating to an embodiment of the present invention will be described hereinafter with reference to FIGS. 1 through 15.

First, a spool 12 and component parts integrated therewith of the webbing retractor 10 will be described. Next, a locking structure and the like will be described. Thereafter, a structure for attaching a cover, which is a main part of the present embodiment, will be described.

Spool and Component Parts Integrated Therewith

Figure 1:
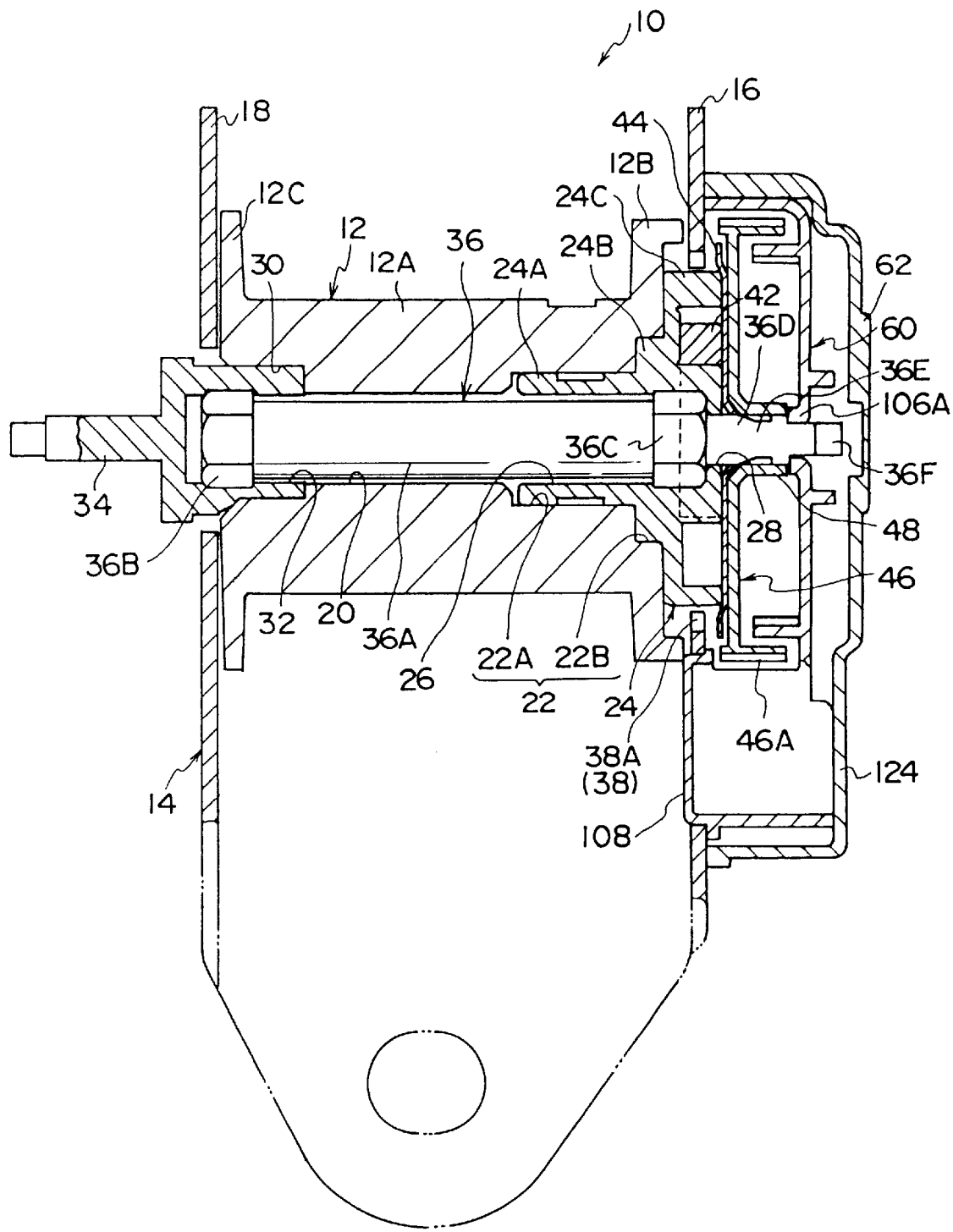
FIG. 1 is a vertical sectional view showing an overall structure of a webbing retractor relating to the present invention.

FIG. 1 is a vertical sectional view illustrating an overall structure of one embodiment of a webbing retractor according to the present invention. As shown in this figure, the webbing retractor 10 includes a frame 14 which is substantially U-shaped when viewed from top, and which is secured to a vehicle body (not shown). The frame 14 includes a first leg plate 16 and a second leg plate 18 which are extended parallel to each other. The spool 12 which is made by die-casting is rotatably supported between the first leg plate 16 and the second leg plate 18.

The spool 12 includes a cylindrical spool shaft 12A forming an axial center portion, and a pair of flange portions formed at end portions of the spool shaft 12A substantially in disc-shapes. (The flange portion disposed at the first leg plate 16 side is called "first flange portion 12B" and the flange portion disposed at the second leg plate 18 side is called "second flange portion 12C", hereinafter.) As a whole, the spool 12 is formed in a spool.

A shaft insertion hole 20 is formed at the axial center portion of the spool shaft 12A. A base lock receiving portion 22 which has a larger diameter than that of the shaft insertion hole 20 is formed as a recess at the first flange portion 12B side of the shaft insertion hole 20 coaxially therewith. The base lock receiving portion 22 includes a recess body 22A which makes up most of the base lock receiving portion 22, and a recess end portion 22B which has a larger diameter than that of the recess body 22A.

A base lock 24 made by die-casting is fitted into the base lock receiving portion 22 such that the base lock 24 cannot be removed. The base lock 24 is fit-in in the following way: after the base lock 24 is inserted into the base lock receiving portion 22, an unillustrated stopper (a removal prevention member) formed substantially in a U-shape when viewed from the front is press-inserted in a direction perpendicular to the spool shaft. While the base lock 24 is made by die-casting in the present embodiment, the base lock 24 is not necessarily made by die-casting. As will become apparent from the operation and effects described below, it suffices for the base lock 24 to be formed from a substance which allows the base lock 24 to engage with ratchet teeth 38A by deforming plastically when the base lock 24 is press-contacted against the ratchet teeth 38A due to a sudden deceleration of the vehicle.

The base lock 24 is formed in a cylindrical shape having a collar, and includes a base portion 24A which is fitted into the recess body 22A of the base lock receiving portion 22; an intermediate portion 24B which has a larger diameter than that of the base portion 24A and is fitted into the recess end portion 22B of the base lock receiving portion 22; and a retaining portion 24C which has a larger diameter than that of the intermediate portion 24B and is disposed so as to abut the outer side surface of the first flange portion 12B. A hexagonal attachment hole 26 is formed at a portion of the base lock 24 other than an outer end of the axial center portion thereof. Further, a small hole 28 which communicates with the axial center portion of the attachment hole 26 and has a smaller diameter than that of the attachment hole 26 is formed at the outer end of the axial center portion of the base lock 24.

On the other hand, a concave sleeve receiving portion 30 which has a larger diameter than that of the shaft insertion hole 20 is formed at the second flange portion 12C side of the shaft insertion hole 20 of the spool shaft 12A. A female spline is formed at an inner circumferential portion of the sleeve-receiving portion 30. Further, a sleeve 34 having a hexagonal attachment hole 32 formed therein is fitted in the sleeve receiving portion 30. A male spline is formed at an outer circumferential portion of the sleeve 34. An inner end of an urging means (a power spring), which urges the spool 12 to rotate in the direction in which the webbing is taken up, is anchored to a tip portion of the sleeve 34 through an unillustrated adapter. The sleeve 34 having the above structure is one of the component parts of a pretensioner which rotates the spool 12 in the direction of taking up the webbing instantaneously when the vehicle suddenly decelerates.

Figure 4:
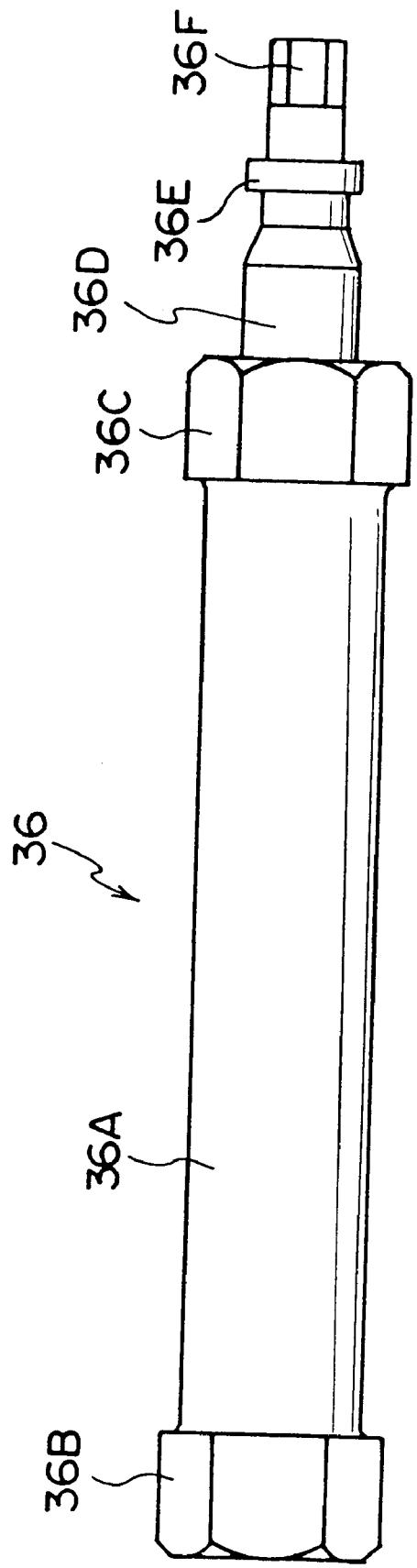
FIG. 4 is a front view of a torsion shaft shown in FIG. 1.
Figure 5:
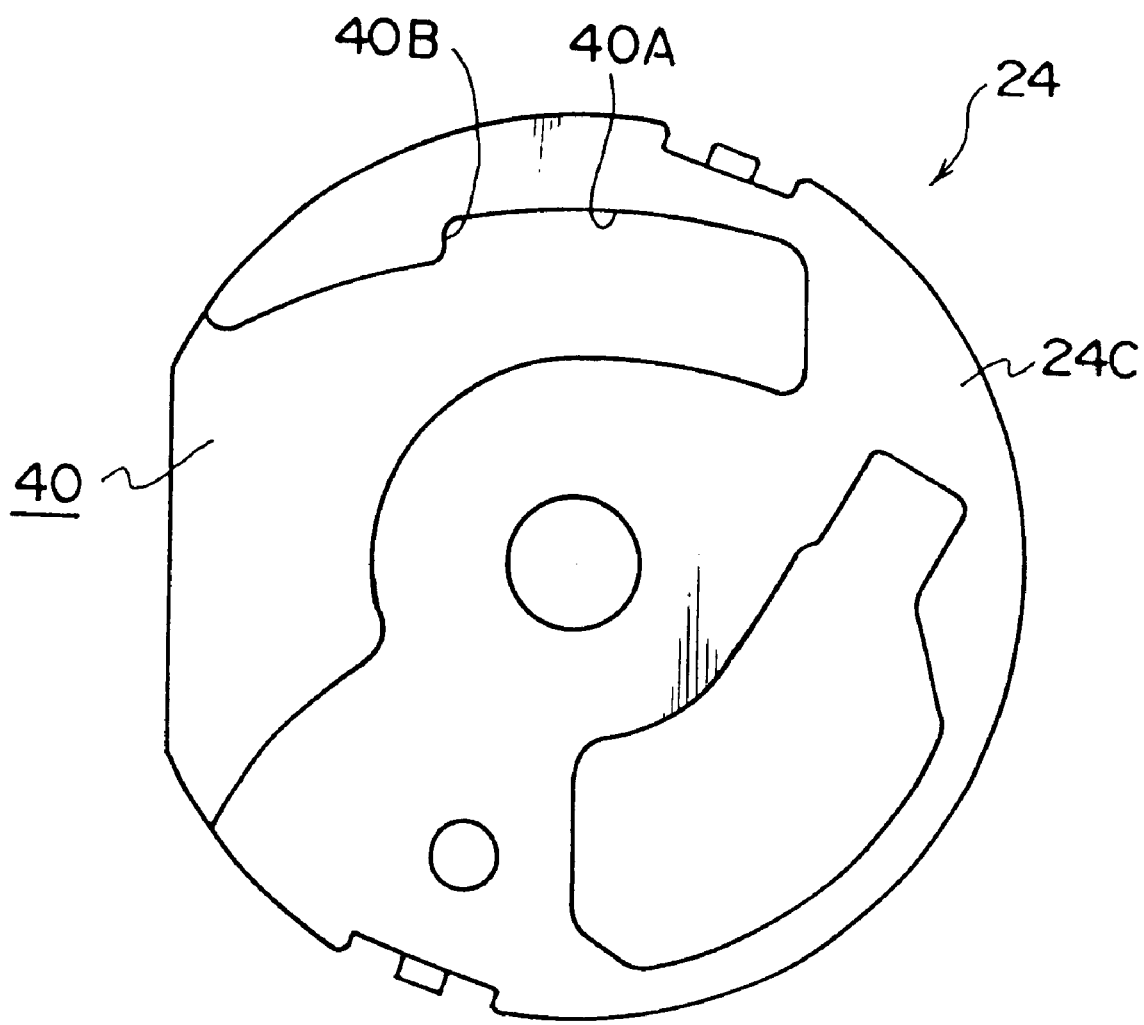
FIG. 5 is a side view of a base lock shown in FIG. 1.

The base lock 24 and the sleeve 34 described above are coupled with each other through a torsion shaft 36. As also shown in FIG. 4, the torsion shaft 36 includes: a shaft portion 36A which forms the main portion thereof; a head portion 36B formed in a hexagonal shape at one end portion of the shaft portion 36A; a fitting portion 36C formed in a hexagonal shape at the other end portion of the shaft portion 36A; a small diameter portion 36D extended coaxially with the shaft portion 36A from the axial center portion of the fitting portion 36C; a gear-holding portion 36E whose diameter decreases along a taper surface from the small diameter portion 36D, and then subsequently increases so as to form an annulus; and a tip portion 36F extended coaxially further from the gear-holding portion 36E and having a key formed thereat. Turning back to FIG. 1, the head portion 36B of the torsion shaft 36 is fitted into the hexagonal attachment hole 32 formed in the sleeve 34, and the fitting portion 36C of the torsion shaft 36 is fitted into the hexagonal attachment hole 26 formed in the base lock 24. The torsion shaft 36 is thereby integrally formed with the spool shaft 12A through the base lock 24 and the sleeve 34. The torsion shaft 36 having the above structure is a main component part of a force limiter which absorbs energy by a torsional deformation thereof when a tension of the webbing greater than a predetermined value acts on the spool 12 when the vehicle decelerates suddenly.

The spool 12, the base lock 24, the sleeve 34, and the torsion shaft 36 in the above structure correspond to the "winding shaft" in the present invention.

Locking Structure and the Like

Figure 2:
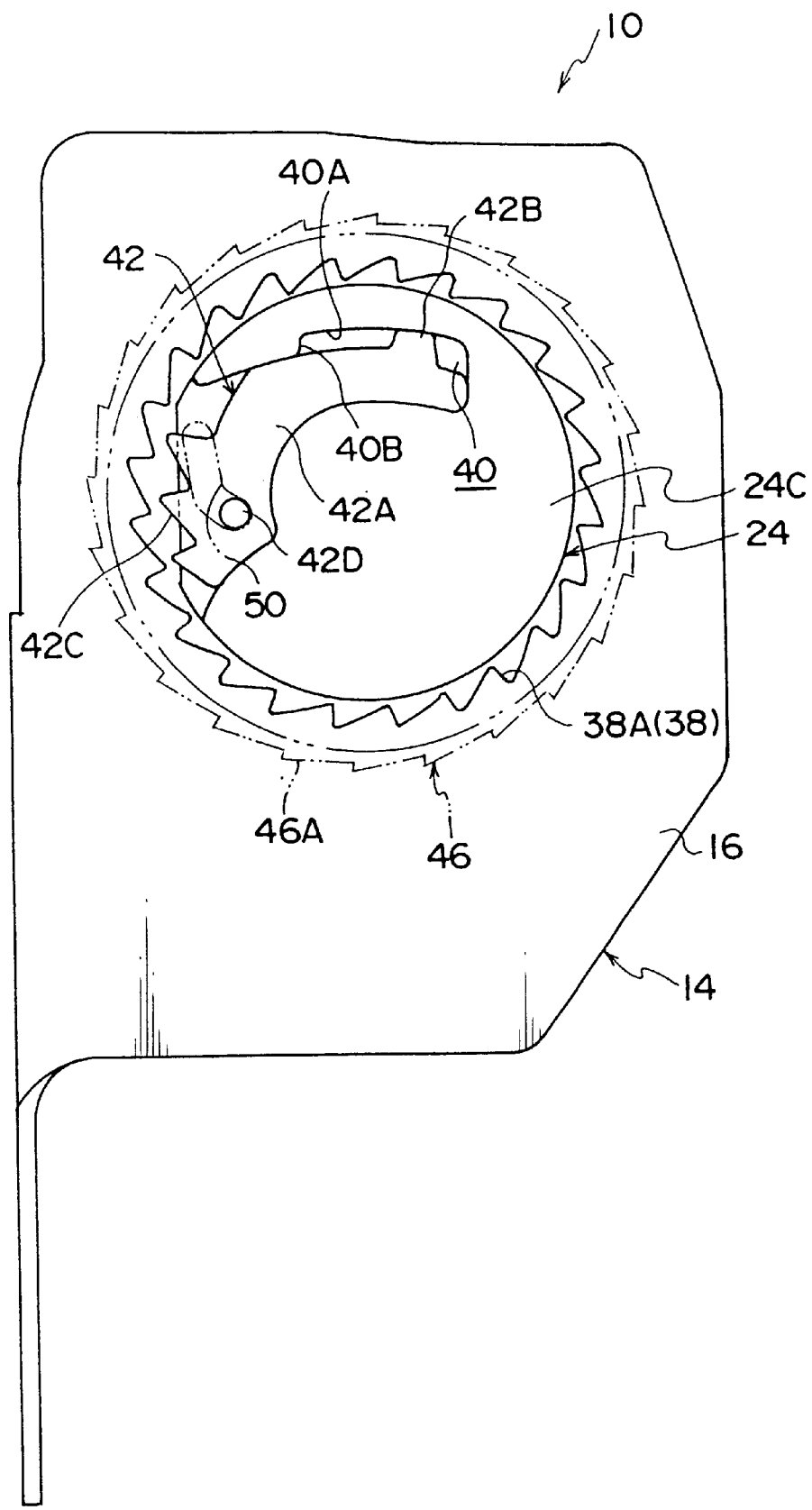
FIG. 2 is a side view of the webbing retractor relating to the present invention in an unlocked state.
Figure 3:
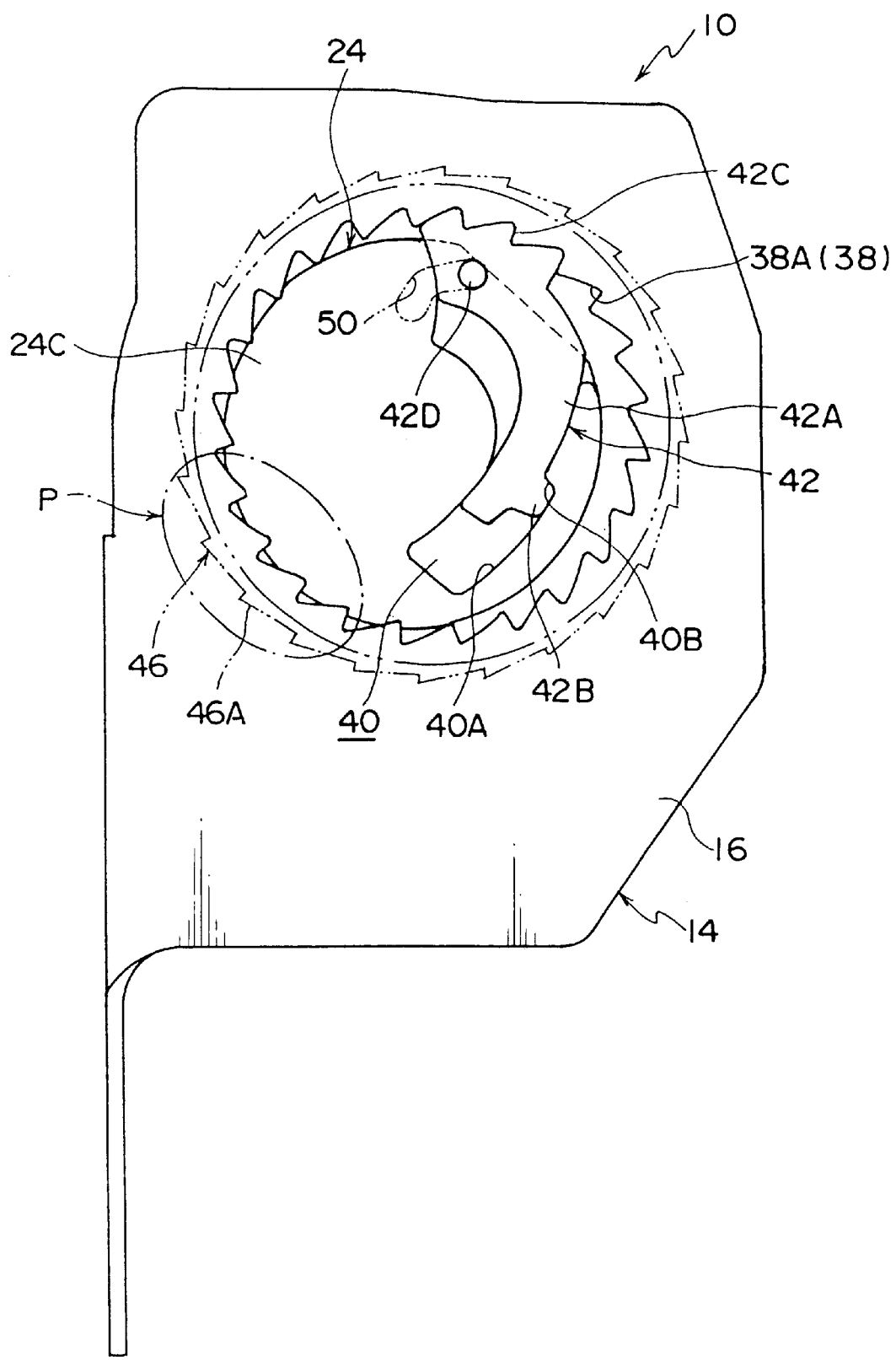
FIG. 3 is a side view of the webbing retractor relating to the present invention in a locked state.

As also shown in FIGS. 2 and 3, an internal-teeth ratchet 38 is formed by cutting into the upper side of the first leg plate 16 of the frame 14. Ratchet teeth 38A of the internal-teeth ratchet 38 are set to have high strength.

The retaining portion 24C of the base lock 24 is disposed at the inner side of the internal-teeth ratchet 38. The small diameter portion 36D of the torsion shaft 36 is inserted into the aforementioned small hole 28 formed in the axial center portion of the retaining portion 24C. An accommodating portion 40 (see FIGS. 2, 3, and 5) is formed as a recess along a peripheral direction of the small hole 28 at the front side of the retaining portion 24C. One end of the accommodating portion 40 is closed, while the other end of the accommodating portion 40 is open. The other end side of the accommodating portion 40 of the retaining portion 24C of the base lock 24 is chamfered so as not to disrupt the engagement of a lock plate 42 (which will be described below) with the internal-teeth ratchet 38. The single lock plate 42 is formed in a substantial arc plate shape (see FIGS. 2, 3, and 6), and is accommodated in the accommodating portion 40. A lock cover 44 is formed in a thin disc shape, and is mounted, in a state such that rotation of the lock cover 44 is prevented, to the outer surface of the retaining portion 24C of the base lock 24 in order to prevent removal of the lock plate 42.

Figure 6:
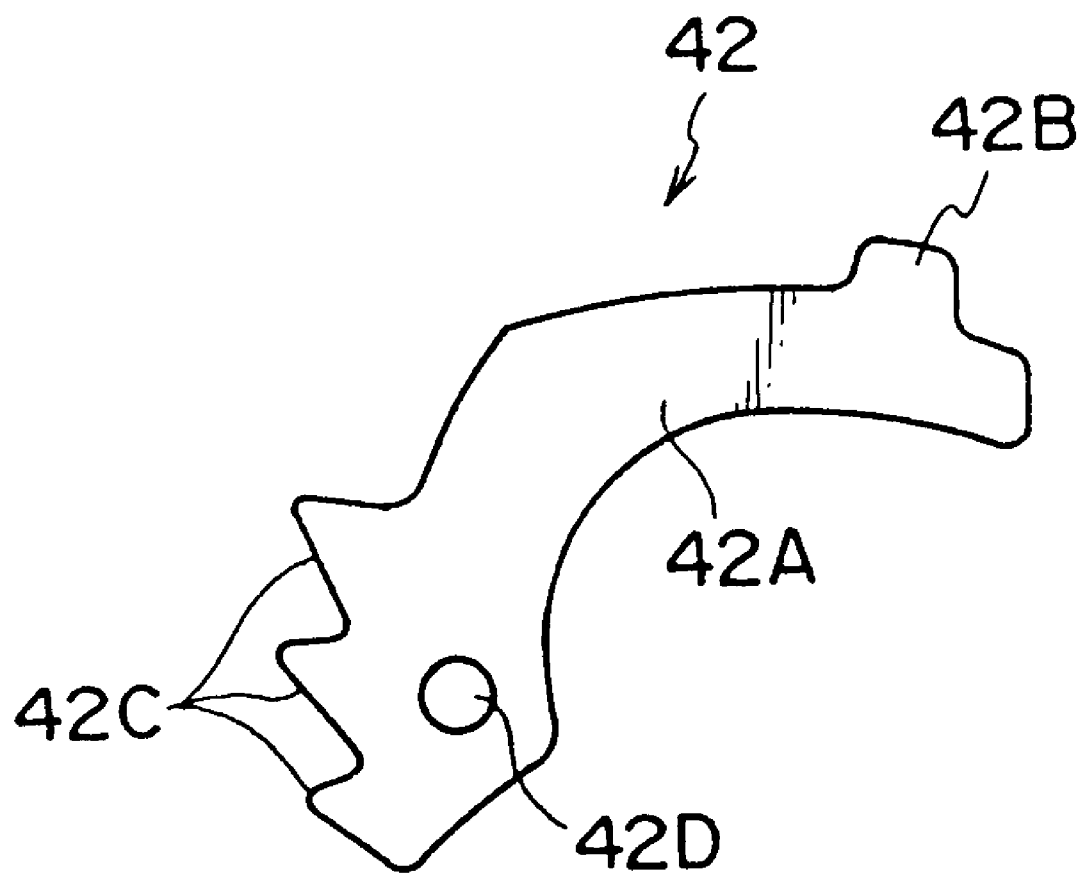
FIG. 6 is a front view of a lock plate shown in FIG. 1.

As shown in FIG. 6 and the like, the lock plate 42 includes: a plate body 42A formed in a substantial arc plate shape and made of metal; a projecting portion 42B formed in a rectangular shape and projecting from one end portion of the plate body 42A; locking teeth 42C having high strength and formed at the peripheral portion of the other end of the plate body 42A and meshing with the ratchet teeth 38A of the internal-teeth ratchet 38 of the first leg plate 16; and a guide pin 42D provided so as to stand erect from the other end of the plate body 42A. A dimension equal to the width of the plate body 42A plus the projecting length of the projecting portion 42B is substantially equal to the width of a wide-width portion 40A (see FIGS. 2 and 3) of the accommodating portion 40 of the base lock 24.

Figure 7:
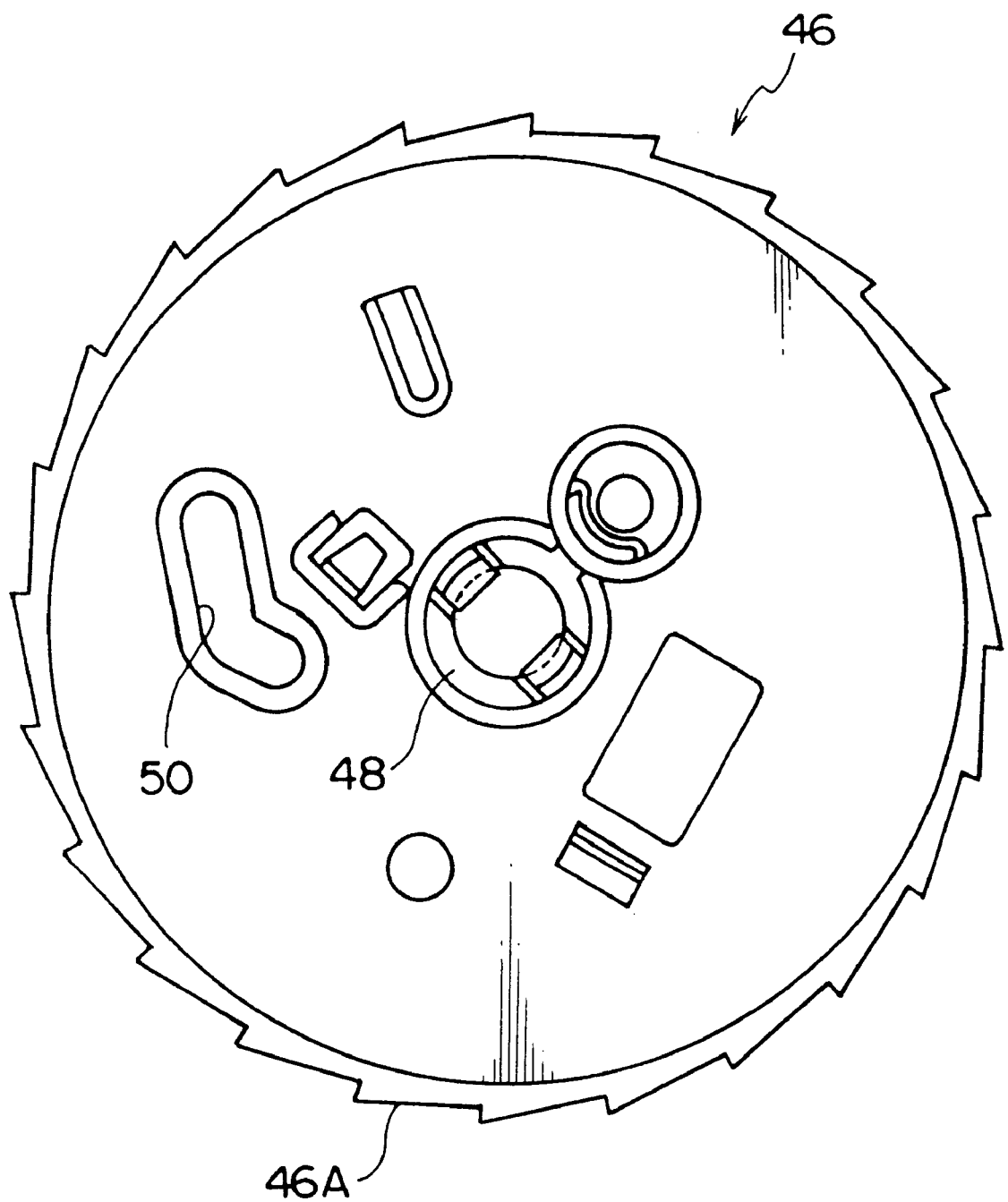
FIG. 7 is a rear view of a V-gear shown in FIG. 1.

A substantially disc shaped V-gear 46 formed to have a diameter larger than that of the aforementioned base lock 24 is disposed at a position adjacent to the base lock 24. As also shown in FIG. 7, a cylindrical boss 48 is formed at an axial center portion of the V-gear 46, and is rotatably supported by the gear-holding portion 36E of the torsion shaft 36 so as to be rotated together with the rotation of the torsion shaft 36. A guide hole 50 which is substantially L-shaped is formed in the V-gear 46, and the guide pin 42D provided so as to stand erect from the lock plate 42 is inserted into the guide hole 50. Further, locking teeth 46A are integrally formed at the peripheral portion of the V-gear 46.

Figure 8:
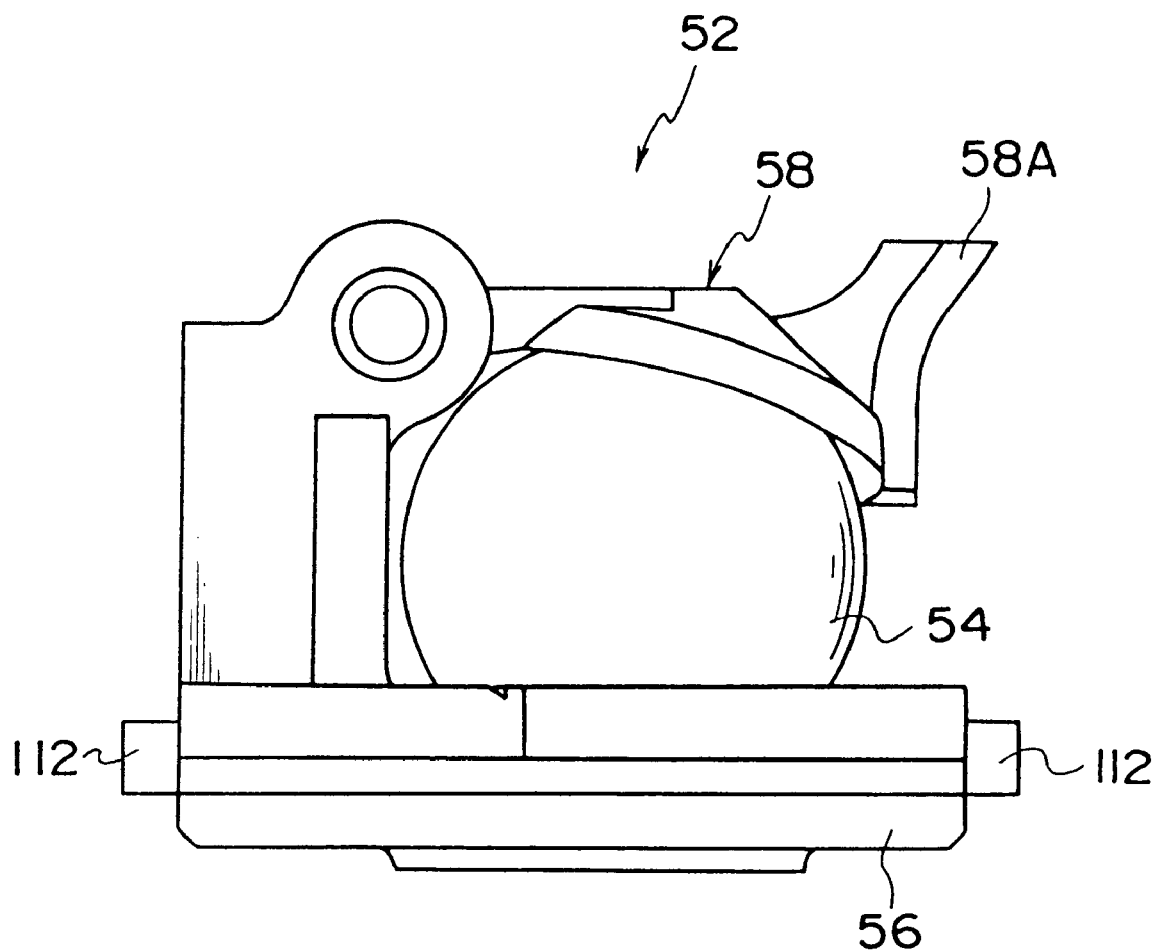
FIG. 8 is a side view of an acceleration sensor which is not illustrated in FIG. 1.

An acceleration sensor 52 which is a known sensor section for VSIR shown in FIG. 8 is provided below the V-gear 46. The acceleration sensor 52 is not illustrated in FIG. 1. When the vehicle decelerates suddenly, a ball 54 of the acceleration sensor 52 rolls on a sensor housing 56 causing a sensor lever 58 to swing, and then a locking pawl 58A of the sensor lever 58 engages with the locking teeth 46A of the V-gear 46.

Structure for Attaching Covers

Figure 9:
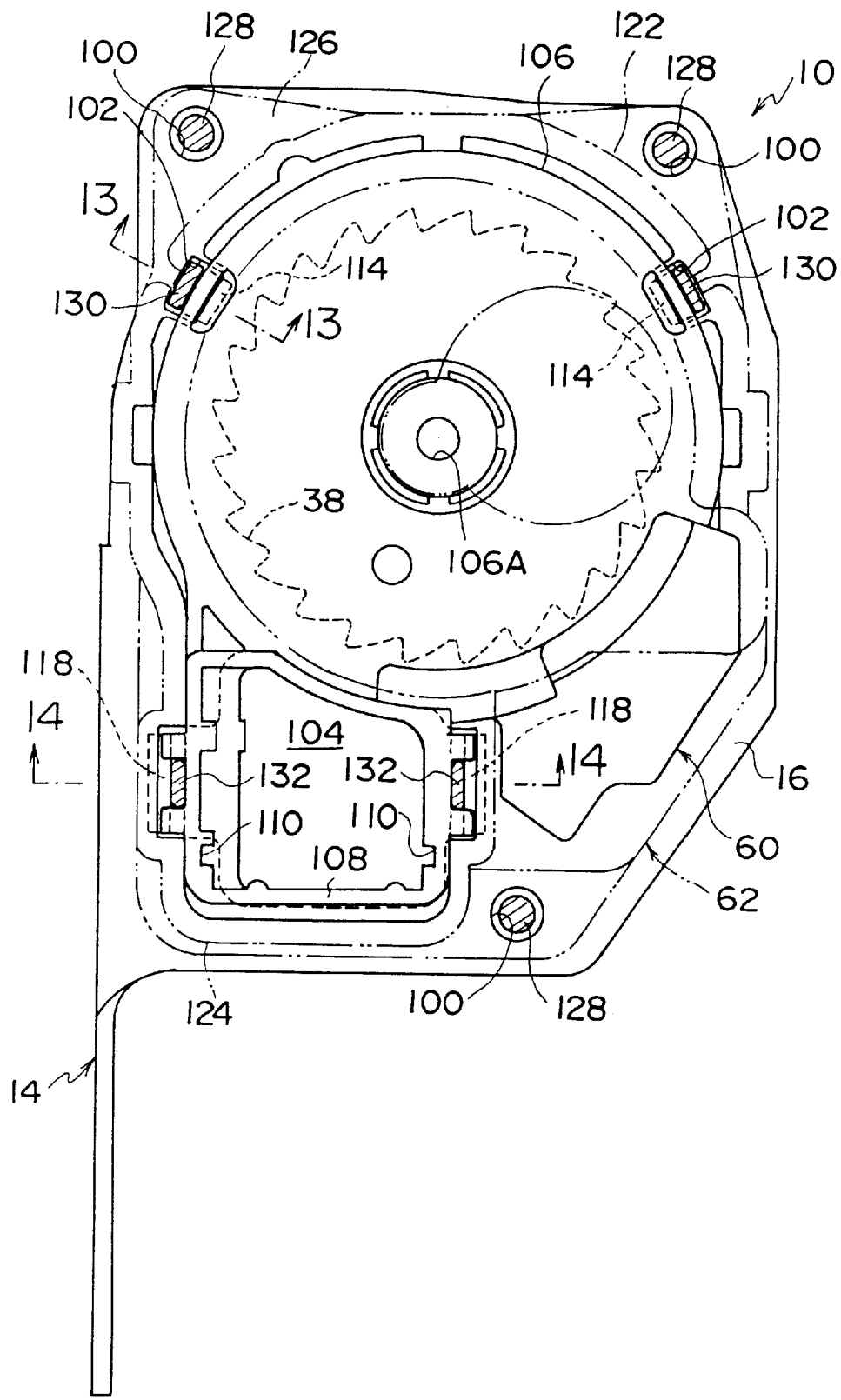
FIG. 9 is a side view of the webbing retractor in a state in which a sensor cover is fitted to a sensor holder so as to cover the sensor holder.

As shown in FIGS. 1 and 9, a sensor holder 60 serving as a "first cover" and made of resin is disposed on the outer side of the first leg plate 16 of the aforementioned frame 14. A sensor cover 62 serving as a "second cover" and made of resin and formed in a shape similar to that of the sensor holder 60, is disposed on the outer side of the sensor holder 60. The sensor holder 60 and the sensor cover 62 are, in an integral manner, attached to the first leg plate 16 of the frame 14, and are described in detail below.

Figure 10:
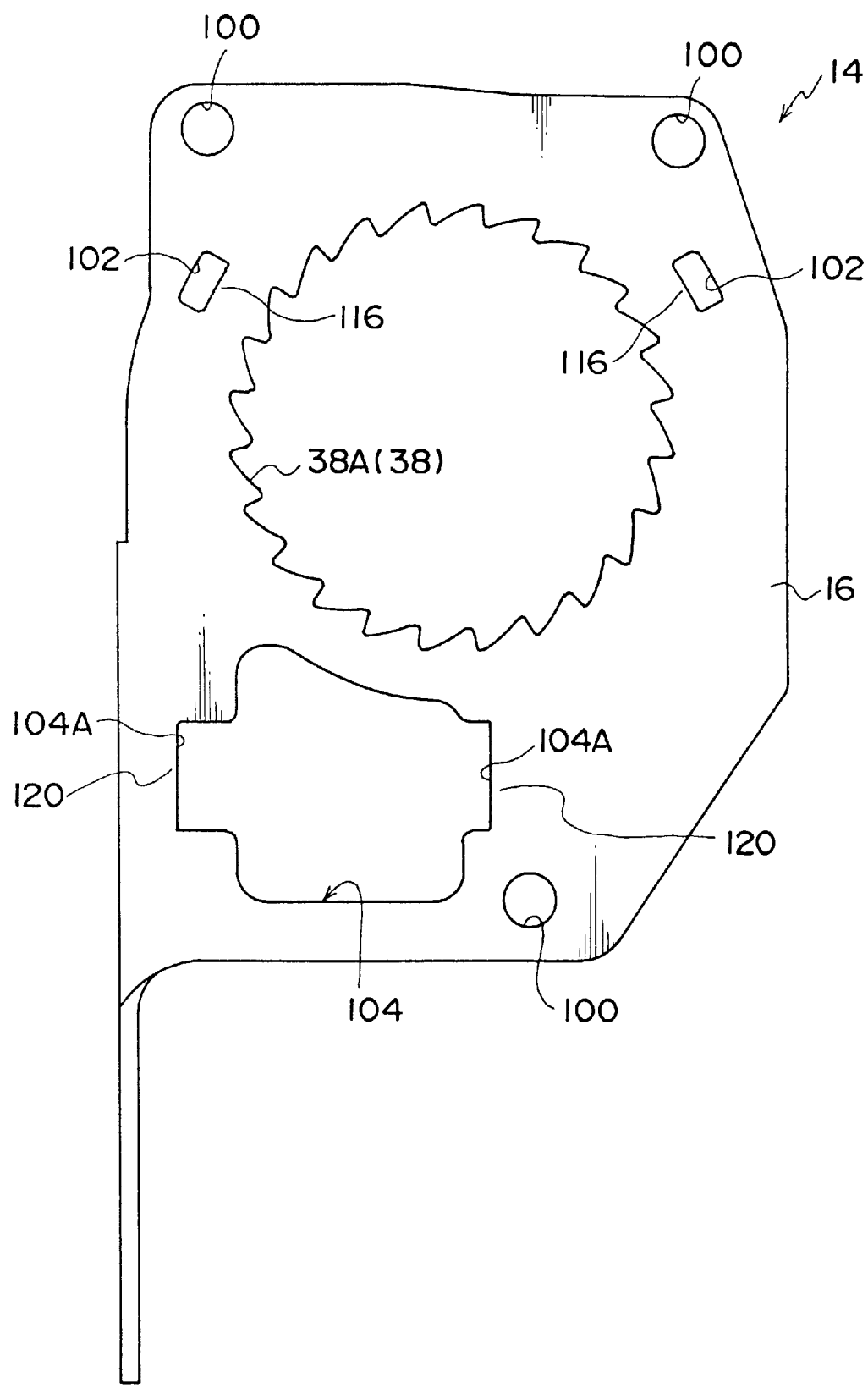
FIG. 10 is a side view of a frame showing a first leg plate shown in FIG. 9.

As shown in FIG. 10, circular holes 100 having a predetermined diameter are formed in the first leg plate 16 such that two are formed in the top portion of the first leg plate 16 and one is formed in the bottom portion of the first leg plate 16. Rectangular attachment holes 102 are respectively formed below the pair of circular holes 100 formed in the top portion of the first leg plate 16. Further, a sensor opening 104 formed in a substantial rectangular shape and having narrow width openings 104A formed at the both sides thereof, is formed in the bottom portion of the first leg plate 16. The rectangular attachment holes 102 and the sensor opening 104 correspond to "attachment holes" in the present invention.

Figure 11:
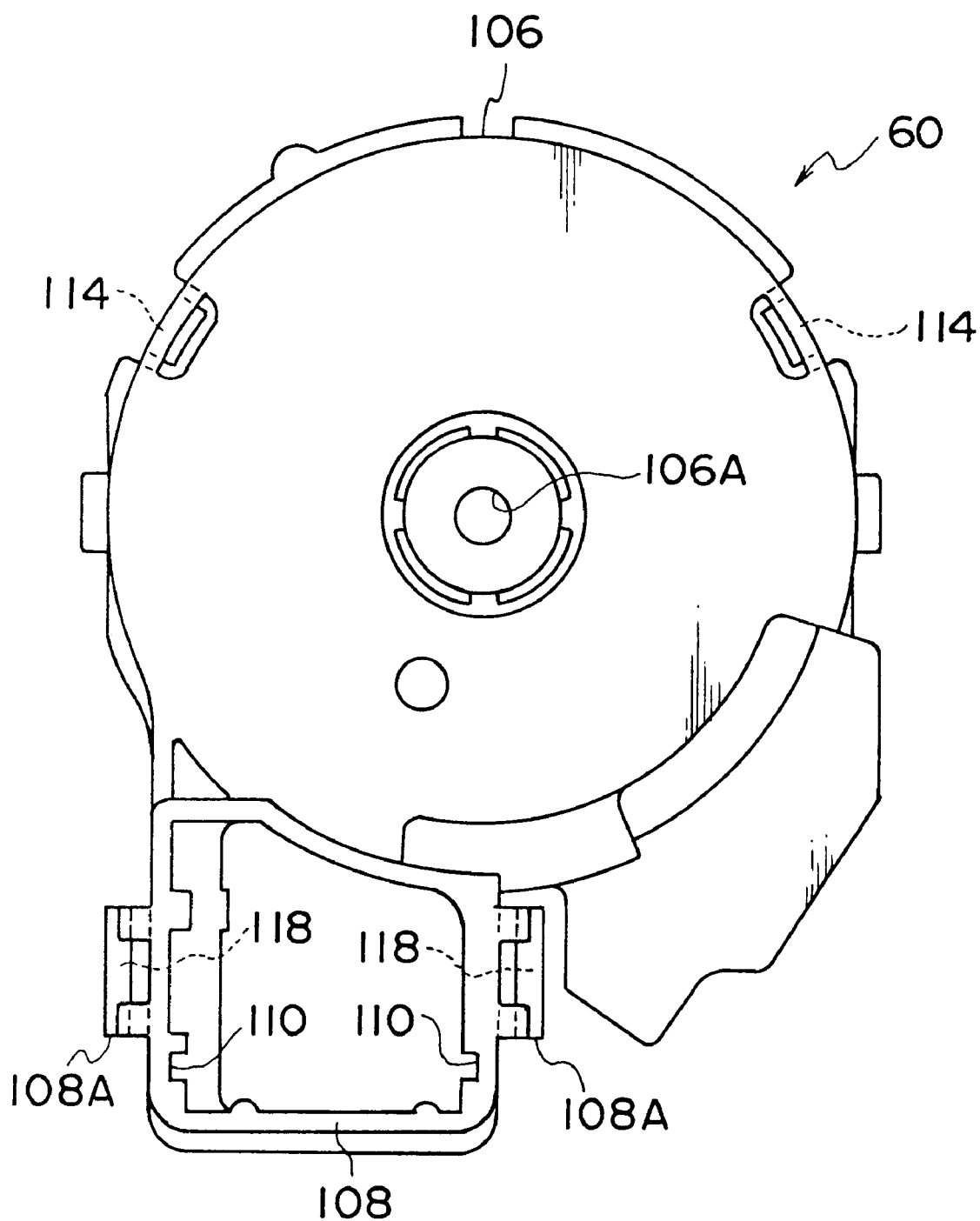
FIG. 11 is a front view of the sensor holder shown in FIG. 9.

As shown in FIGS. 9 and 11, the sensor holder 60 comprises a holder body portion 106 formed in a rectangular or oval pipe shape, and a sensor holding portion 108 which is formed in a substantially rectangular shape at the lower edge side of the holder body portion 106 and which is open at the outer side and the top side thereof. Inner teeth which can engage with an unillustrated pawl for WSIR and which are rotatably supported by the aforementioned V-gear 46, are integrally formed at the inner circumferential portion of the holder body portion 106. Further, a cylindrical shaft-supporting portion 106A is integrally formed at an axial center portion of the holder body portion 106. The tip portion 36F of the torsion shaft 36 is rotatably supported by the shaft-supporting portion 106A (see FIG. 1). A pair of pin insertion holes 110 are formed at the lower portion of the sensor holding portion 108, and a pair of pins 112 formed at the sensor housing 56 of the acceleration sensor 52 (see FIG. 8) are inserted into the pin insertion holes 110.

Further, engaging pawls 114 (see FIG. 13) are formed at the upper portion of the outer peripheral portion of the holder body portion 106 in correspondence with the attachment holes 102 of the first leg plate 16. When the sensor holder 60 is attached to the first leg plate 16, a pawl portion 114A of the engaging pawl 114 engages with an edge portion 116 at the inner circumferential side of the attachment hole 102. The engaging pawls 114 can deform elastically in a radial direction of the holder body portion 106.

As shown in FIG. 11, a pair of projecting portions 108A, which are substantially inserted into the narrow width openings 104A of the sensor opening 104 of the aforementioned first leg plate 16, are formed at the side portion of the sensor holding portion 108. An engaging pawl 118, which can elastically deform in a plate thickness direction of the projecting portion 108A (see FIG. 14), is formed at each of the projecting portions 108A. By deforming elastically, the pawl portion 118A of the engaging pawl 118 engages with a circumferential portion 120 of the narrow width opening 104A of the first leg plate 16.

Figure 12:
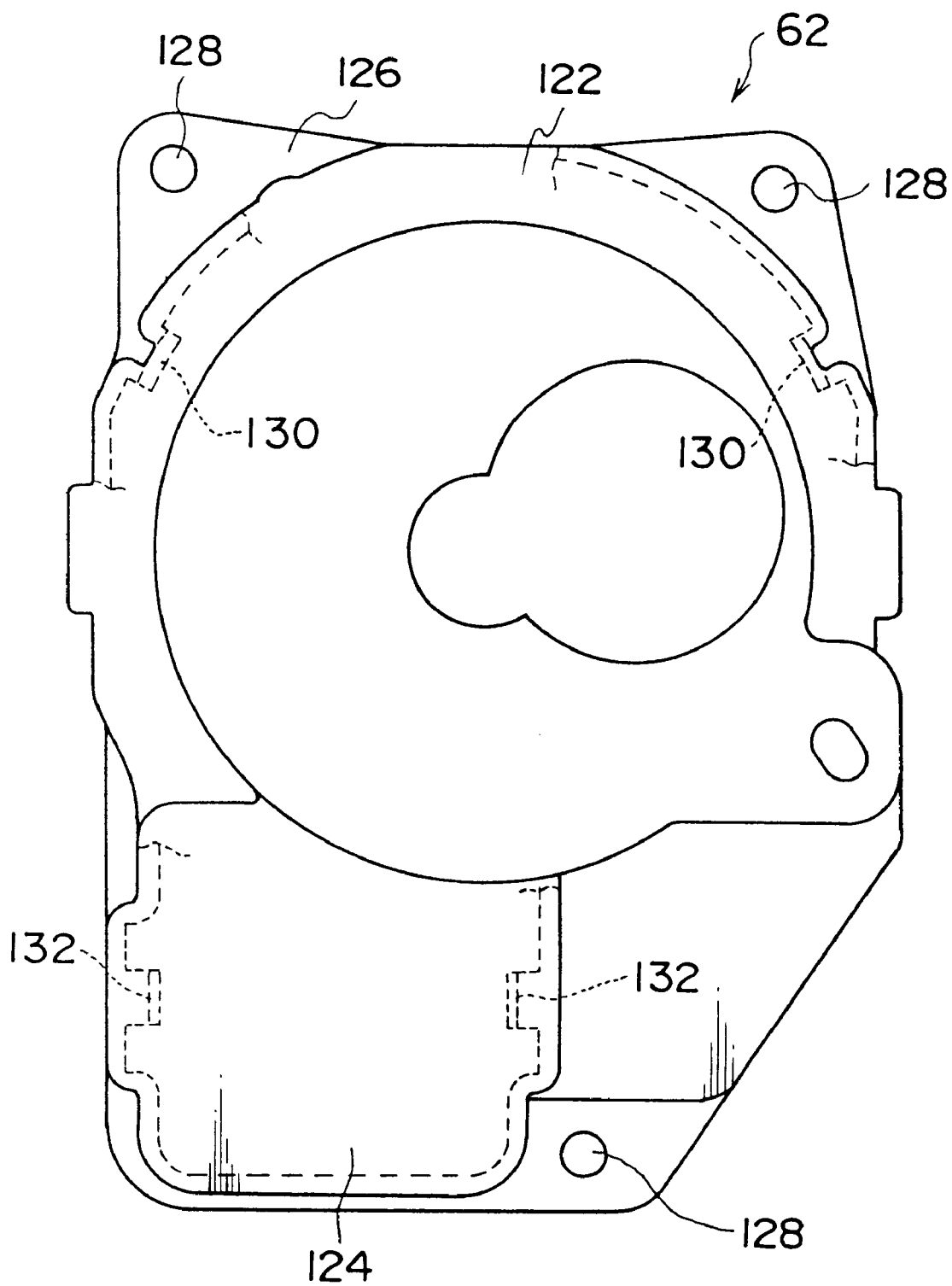
FIG. 12 is a front view of the sensor cover shown in FIG. 9.

On the other hand, as shown in FIGS. 9 and 12, the sensor cover 62 includes a cover body portion 122 formed in a rectangular or oval pipe shape, a sensor protection portion 124 formed at the lower edge side of the cover body portion 122, and an attachment seat 126 which abuts to the first leg plate 16. When the sensor cover 62 is fitted to the sensor holder 60 so as to cover the sensor holder 60, the sensor protection portion 124 covers the outside surface, which is an open surface, of the sensor holding portion 108, thereby protecting the acceleration sensor 52. A total of three resin pins 128 each having a slit formed at a predetermined position in a circumferential direction thereof are integrally formed on the attachment seats 126. By elastically fitting these resin pins 128 into circular holes 100 of the first leg plate 16, the sensor cover 62 is fixed to the outer side of the first leg plate 16.

A pair of removal preventing portions 130 are formed at the upper peripheral side of the cover body portion 122 of the sensor cover 62 in correspondence with the pair of engaging pawls 114 of the sensor holder 60. The removal preventing portion 130 is positioned so as to be able to be inserted into the attachment hole 102 of the first leg plate 16, and is positioned at the radial direction outer side of the engaging pawl 114, so as to prevent the engaging pawl 114 from coming out of the attachment hole 102 (see FIG. 13). The opening width of the attachment hole 102 is substantially equal to the total of the plate thickness of the engaging pawl 114 plus the plate thickness of the removal preventing portion 130.

A pair of removal preventing portions 132 are formed at the side portions of the sensor protection portion 124 in correspondence with the pair of engaging pawls 118 formed at the sensor holding portion 108. The removal preventing portions 132 is inserted at the inner side of the engaging pawl 118 so as to prevent the engaging pawl 118 from coming out of the attachment hole 104 (see FIG. 14).

The Operation and the Effects

A vehicle occupant holds an unillustrated tongue plate, through which the webbing passes, and draws out the webbing from the spool 12 against the urging force of the power spring, and then engages the tongue plate with an unillustrated buckle device. Thus, the webbing of a three-point seat belt apparatus is applied to the vehicle occupant. That is, a portion of the webbing from an unillustrated shoulder anchor provided at an upper portion of a center pillar to the tongue plate is a shoulder-side portion of the webbing, and a portion of the webbing from the tongue plate to the buckle device is a lap-side portion of the webbing.

In this state, when the vehicle which is travelling suddenly decelerates, an unillustrated pretensioner operates via the sleeve 34 to rotate the spool 12 instantly in the direction in which the webbing is retracted. At the same time, the acceleration sensor 52 detects the sudden deceleration of the vehicle. That is, the ball 54 of the acceleration sensor 52 rolls on the sensor housing 56 and swings the sensor lever 58. The locking pawl 58A of the sensor lever 58 thereby engages with the locking teeth 46A of the V-gear 46 to block rotation of the V-gear 46 in the direction in which the webbing is drawn out.

Meanwhile, the tension applied to the webbing by the occupant makes the spool 12 begin rotation in the direction in which the webbing is drawn out. Therefore, a relative rotation is generated between the spool 12 beginning to rotate in a direction in which the webbing is drawn out and the V-gear 46 whose rotation in a direction in which the webbing is drawn out is being impeded. When this relative rotation is generated, as can be seen by comparing FIGS. 2 and 3, the guide pin 42D of the lock plate 42 retained in the accommodating portion 40 formed at the retaining portion 24C of the base lock 24 is guided by the guide hole 50 of the V-gear 46 and moved outwards substantially in a radial direction of the base lock 24. The locking teeth 42C of the lock plate 42 thereby mesh with the ratchet teeth 38A of the internal-teeth ratchet 38 provided at the first leg plate 16 of the frame 14.

Further, when the locking teeth 42C of the lock plate 42 mesh with the ratchet teeth 38A of the internal-teeth ratchet 38, a reaction force generated at that time acts on the retaining portion 24C of the base lock 24. This reaction force is significantly large since it is generated by the meshing of the high strength lock teeth 42C and the ratchet teeth 38A when the vehicle suddenly decelerates. Accordingly, the reaction force also acts on the torsion shaft 36 which penetrates through the axial center portion of the base lock 24. Furthermore, since the tip portion 36F of the torsion shaft 36 is rotatably supported by the shaft-supporting portion 106A of the sensor holder 60 which is made of resin, the reaction force acts onto the shaft-supporting portion 106A of the sensor holder 60 from the tip portion 36F of the torsion shaft 36, and elastically deforms the shaft-supporting portion 106A of the sensor holder 60 in the direction in which the reaction force acts, that is toward a side opposite to the engagement position of the lock plate 42. A portion of the periphery of the retaining portion 24C of the base lock 24, as seen in the area defined by the one-dotted line and designated by arrow P in FIG. 3, is thereby firmly pressed against the ratchet teeth 38A of the internal-teeth ratchet 38 of the frame 14. Since the base lock 24 is made by die-casting and is relatively soft, it plastically deforms and bites into the ratchet teeth 38A when it is pressed against the ratchet teeth 38A. Thus, the base lock 24 and the ratchet teeth 38A are directly engaged. Therefore, rotation of the spool 12 in the direction in which the webbing is drawn out is impeded, that is, the spool 12 is locked.

The sensor holder 60 and the sensor cover 62 of the present embodiment are attached to the first leg plate 16 of the frame 14 as described below, and the operation and the effects described below are obtained.

First, the sensor holder 60 is placed on the outer side of the first leg plate 16 of the frame 14. Then, the upper pair of engaging pawls 114 are inserted into the attachment holes 102 of the first leg plate 16, and the lower pair of engaging pawls 118 are inserted into the narrow-width openings 104A of the sensor opening 104 of the first leg plate 16. At this time, the pawl portions 114A of the engaging pawls 114 elastically deform within the ranges of the opening widths of the attachment holes 102, slide along the inner circumferential sides of the attachment holes 102, and then engage with the edge portions 116 by returning elastically. Similarly, the pawl portions 118A of the engaging pawls 118 elastically deform toward the inner side of the sensor opening 104 by interfering with the circumferential portions 120 of the narrow-width openings 104A of the first leg plate 16, and engage with the circumferential portions 120 by returning elastically.

As described above, the tip portion 36F of the torsion shaft 36 is rotatably supported by the shaft-supporting portion 106A of the sensor holder 60 attached to the outer side of the first leg plate 16. On the other hand, the acceleration sensor 52 is mounted to the sensor holding portion 108 of the sensor holder 60.

Next, the sensor cover 62 is fitted to the outer side of the sensor holder 60 so as to cover the sensor holder 60. The sensor cover 62 is fixed to the outer side of the first leg plate 16 by the three resin pins 128 formed at the attachment seats 126 being elastically fitted into the circular holes 100 of the first leg plate 16. At this time, the removal preventing portions 130 formed at the upper side of the sensor cover 62 are inserted at the radial direction outer sides of the engaging pawls 114 which already have been inserted into the attachment holes 102. Thus, the engaging pawls 114 of the sensor holder 60 are unable to deform elastically in the direction in which the engaging pawls 114 come out, thereby preventing the removal of the engaging pawls 114. The removal preventing portions 132 formed at the lower side of the sensor cover 62 are inserted at the inner sides of the engaging pawls 118 which already have been inserted in the narrow-width openings 104A of the sensor opening 104. Thus the engaging pawls 118 of the sensor holder 60 cannot deform elastically in the direction in which the engaging pawls 118 come out, thereby preventing the engaging pawls 118 from being removed.

As described above, the sensor protection portion 124 of the sensor cover 62 is fitted to the outer side of the sensor holder 60 so as to cover the outer surface, which is an open surface, of the sensor holding portion 108 of the sensor holder 60, and thereby protects the acceleration sensor 52.

Thus, in the present embodiment, two types of covers, i.e., the sensor holder 60 and the sensor cover 62, are provided at the outer side of the first leg plate 16. The sensor holder 60 is provided with the shaft-supporting portion 106A which rotatably supports the tip portion 36F of the torsion shaft 36 and the sensor holding portion 108 which holds the acceleration sensor 52 which detects a sudden deceleration of the vehicle. The sensor cover 62 is provided with the sensor protection portion 124. Although the number of covers to be used is increased, the sensor holder 60 and the sensor cover 62 can be attached to the outer side of the first leg plate 16 without using plugs which conventionally have been used often.

If the sensor holder 60 and the sensor cover 62 were respectively fixed to the first leg plate 16 by plugs, many plugs would have to be hammered into the first leg plate 16. This would cause various disadvantages such as, it would be difficult to secure space for these plugs to be hammered, or the task of assembling the covers would be troublesome or time-consuming, or the like. However, all these problems are eliminated according to the present embodiment.

Further, while the sensor holder 60 is provided with the shaft-supporting portion 106A which rotatably supports the tip portion 36F of the torsion shaft 36, if the sensor holder 60 were fixed to the first leg plate 16 by using plugs, the strength of attachment of the sensor holder 60 to the first leg plate 16 in the direction of thrust (axial direction) would likely be low. Therefore, some device would be needed to prevent the removal of the sensor holder 60 from the first leg plate 16 when a load in the direction of thrust was applied from the spool 12 and the torsion shaft 36 to the shaft-supporting portion 106A of the sensor holder 60 for a long time period. However, according to the present embodiment, as long as the state in which the sensor cover 62 is attached to the first leg plate 16 is maintained, the sensor holder 60 will not come off from the first leg plate 16 since the elastic deformation of the engaging pawls 114 and 118 of the sensor holder 60 in the direction of coming out from the attachment holes 102 and the narrow-width openings 104A is impeded by the removal preventing portions 130 and 132 of the sensor cover 62.

In addition, if the sensor holder 60 were fixed to the first leg plate 16 by using plugs, the positioning of the sensor holder 60 with respect to the first leg plate 16 would be difficult. That is, the accuracy of positioning the sensor holder 60 with respect to the first leg plate 16 would likely be low. However, in accordance with the present embodiment, due to the insertion of the removal preventing portions 130 and 132 into the attachment holes 102 and the narrow-width openings 104A, the engaging pawls 114 and 118 of the sensor holder 60 are both restrained in states of being engaged to the edge portions 116 at the inner circumferential side of the attachment holes 102 and the circumferential portions 120 of the narrow width openings 104A. Therefore, the sensor holder 60 does not get out of position with respect to the first leg plate 16. That is, accuracy in positioning the sensor holder 60 with respect to the first leg plate 16 is improved.

From the above, it can be seen that the structure for attaching covers employed in the present embodiment is suitable for attaching the sensor holder 60 which functions as a shaft-supporting portion.

In the present embodiment, the present invention is applied to the webbing retractor 10 which is an apparatus which combines a pretensioner and a force limiter. However, the present invention is not limited to the present embodiment and can be applied to various types of webbing retractors.

In the present embodiment, the present invention is applied to the attachment of two types of covers which are the sensor holder 60 which has a shaft supporting function and a sensor holding function, and the sensor cover 62 which has a sensor protecting function. However, in the future, functions different from those in the present embodiment may be desired from each of these covers, and the present invention is also applicable in such cases.

Although the plurality of attachment holes 102, the plurality of narrow width openings 104A, the plurality of engaging pawls 114 and 118, and the plurality of removal preventing portions 130 and 132 are provided in the present embodiment, these elements may be provided in any numbers. For example, the present invention may be applied to only one of these elements. In this case, an effect depending on the number of provided elements will be obtained.

Figure 13:
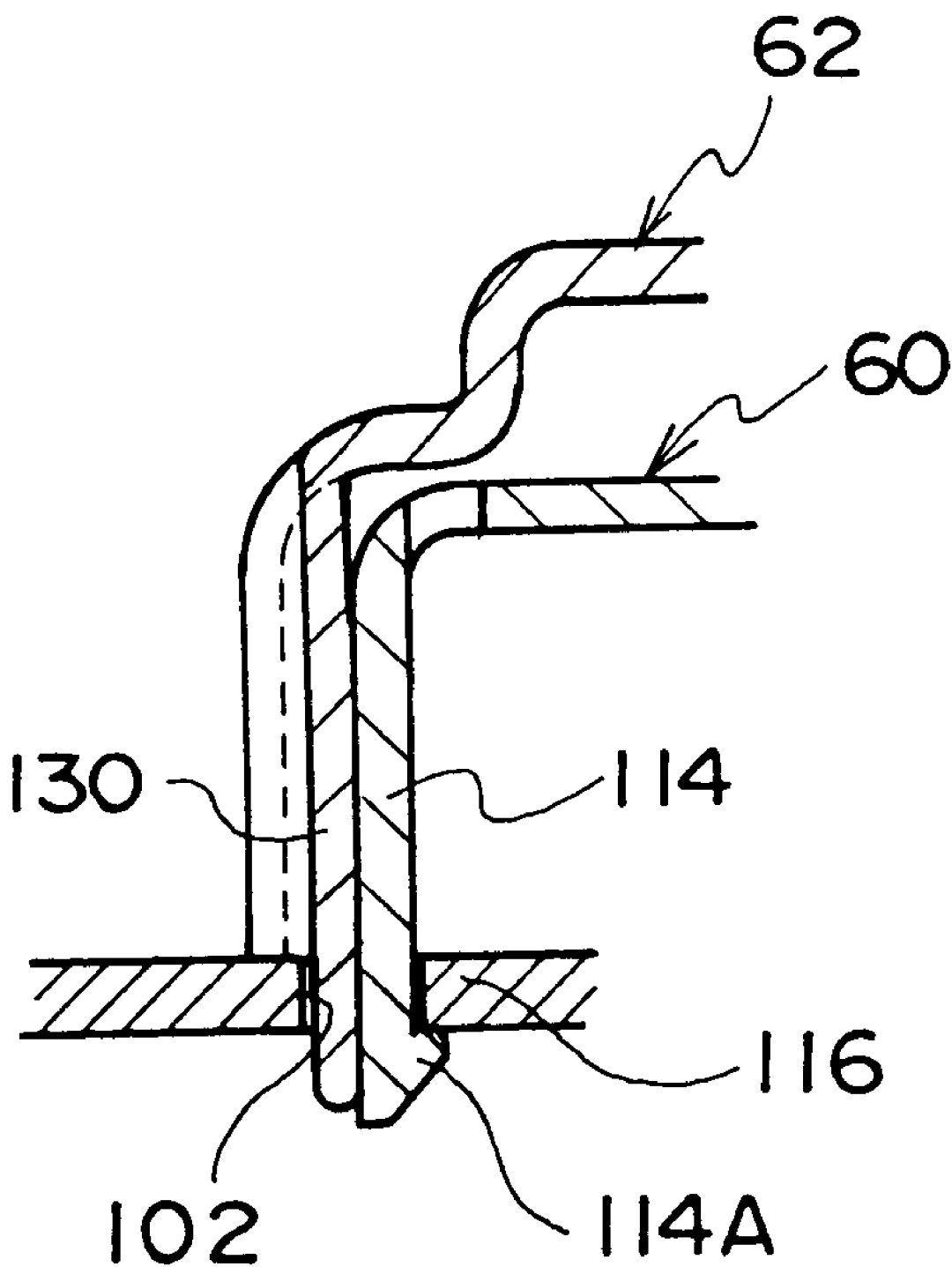
FIG. 13 is a cross-sectional view along line 13—13 of FIG. 9 showing the relationship between an engaging pawl and a removal preventing portion at a holder body portion side.
Figure 14:
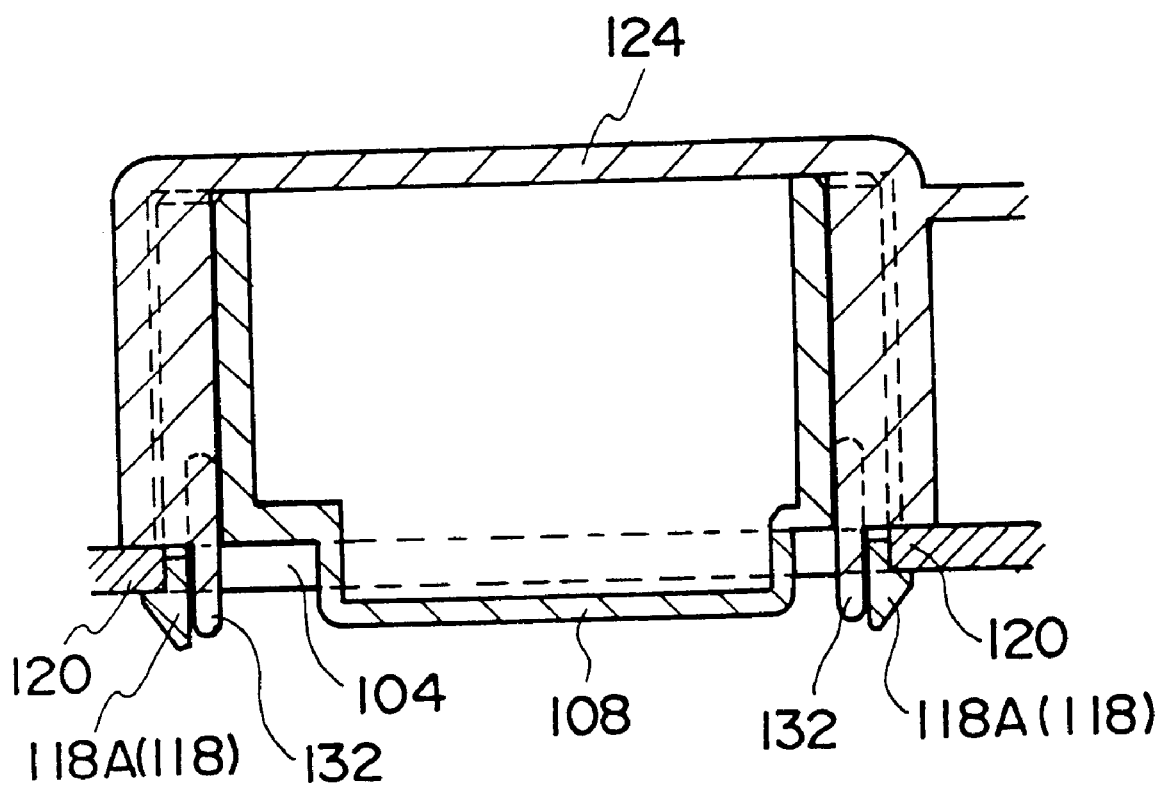
FIG. 14 is a cross-sectional view along line 14—14 of FIG. 9 showing the relationship between the engaging pawl and the removal preventing portion at a sensor holding portion side.
Figure 15:
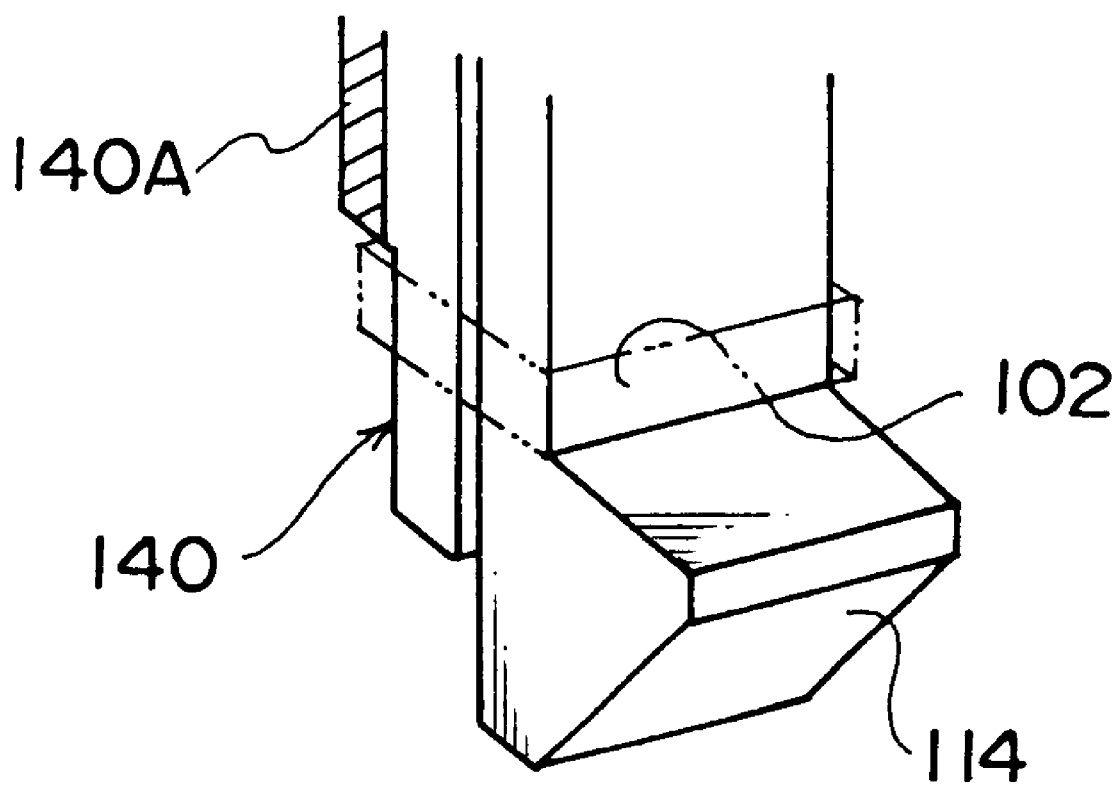
FIG. 15 is a perspective view showing another embodiment of the removal preventing portion.

As shown in FIG. 13 as a representative example, the removal preventing portions 130 and 132 are formed as flat insertion portions in the present embodiment. However, a step-shaped removal preventing portion 140 such as that in FIG. 15 may be applied. The portion of the removal preventing portion 140 which is not inserted into the attachment hole 102 is formed to be thick. In this case, due to the existence of a thick portion 140A at the removal preventing portion 140, rigidity of the removal preventing portion 140 is increased (i.e., it is difficult for the removal preventing portion 140 to break). Further, the thick portion 140A serves to limit the depth of insertion of the removal preventing portion 140 into the attachment hole 102.

What is claimed is:

1. A webbing retractor comprising:

a frame which is fixed to a vehicle body, and has a pair of leg plates which rotatably support therebetween a winding shaft for winding in layers a webbing for restraining a vehicle occupant, and which has one or more attachment holes in each of said leg plates;

a first cover which is disposed at an outer side of said leg plate of said frame and is provided with one or more engaging pawls to be engaged with a peripheral portion of said one or more attachment holes by deforming elastically within a range of an opening width of said attachment hole; and a second cover adapted to be secured to said leg plate so as to cover said first cover, and having one or more removal preventing portions to be inserted in the said one or more attachment holes bearing said one or more engaging pawls to prevent said one or more engaging pawls from coming out of the attachment hole.

2. A webbing retractor according to claim 1, wherein said first cover includes a shaft-supporting portion which rotatably supports said winding shaft, and a sensor holding portion which holds a sensor section which detects a state of sudden deceleration of the vehicle; and said second cover comprises a sensor protection portion which protects said sensor section.

3. A webbing retractor according to claim 1, wherein said second cover is secured in such a manner that said second cover is fitted to said first cover so as to cover said first cover by pins formed on said second cover elastically fitting into circular attachment holes formed in said leg plate.

4. A webbing retractor according to claim 1, wherein said engaging pawl is engaged with said one or more attachment holes by a pawl portion which engages with an edge portion of an inner circumferential portion of each attachment hole.

5. A webbing retractor according to claim 1, wherein a cross-sectional configuration of said removal preventing portion is substantially rectangular.

6. A webbing retractor according to claim 1, wherein said removal preventing portion has a step-shaped cross-sectional configuration, and includes a thick portion and a thin portion, the thin portion being adapted to be inserted in said one or more attachment holes.

* * * * *